United States Patent [19]
Trotter et al.

[11] 3,806,026
[45] Apr. 23, 1974

[54] CONTROL MEANS FOR LIQUID HEATER

[76] Inventors: Ursus Trotter; Albin Trotter, both of Exequias Alliende 2458, Santiago, Chile

[22] Filed: Apr. 26, 1973

[21] Appl. No.: 344,763

[52] U.S. Cl. ................................. 236/23, 137/87
[51] Int. Cl. .......................................... F22b 35/00
[58] Field of Search .............. 236/23, 25 R; 137/87

[56] References Cited
UNITED STATES PATENTS

| | | | |
|---|---|---|---|
| 3,426,971 | 2/1969 | Meier | 236/23 |
| 2,848,167 | 8/1958 | Matthews | 236/23 |
| 3,118,600 | 1/1964 | Miller | 236/23 |
| 1,878,270 | 9/1932 | Eberspacher | 236/25 |
| 2,009,193 | 7/1935 | Hegwein | 236/25 |

*Primary Examiner*—William E. Wayner
*Assistant Examiner*—W. E. Tapolcai, Jr.
*Attorney, Agent, or Firm*—Brisebois & Kruger

[57] ABSTRACT

Valve controlling the supply of gas to a liquid heater is magnetically actuated by a magnet slidably mounted in the liquid inlet to said heater. The extent of opening of the valve is controlled by a thermostat, and opening of the valve is inhibited by a dashpot. Alternatively the valve may be an electric switch controlling the supply of electric current.

6 Claims, 1 Drawing Figure

PATENTED APR 23 1974 3,806,026
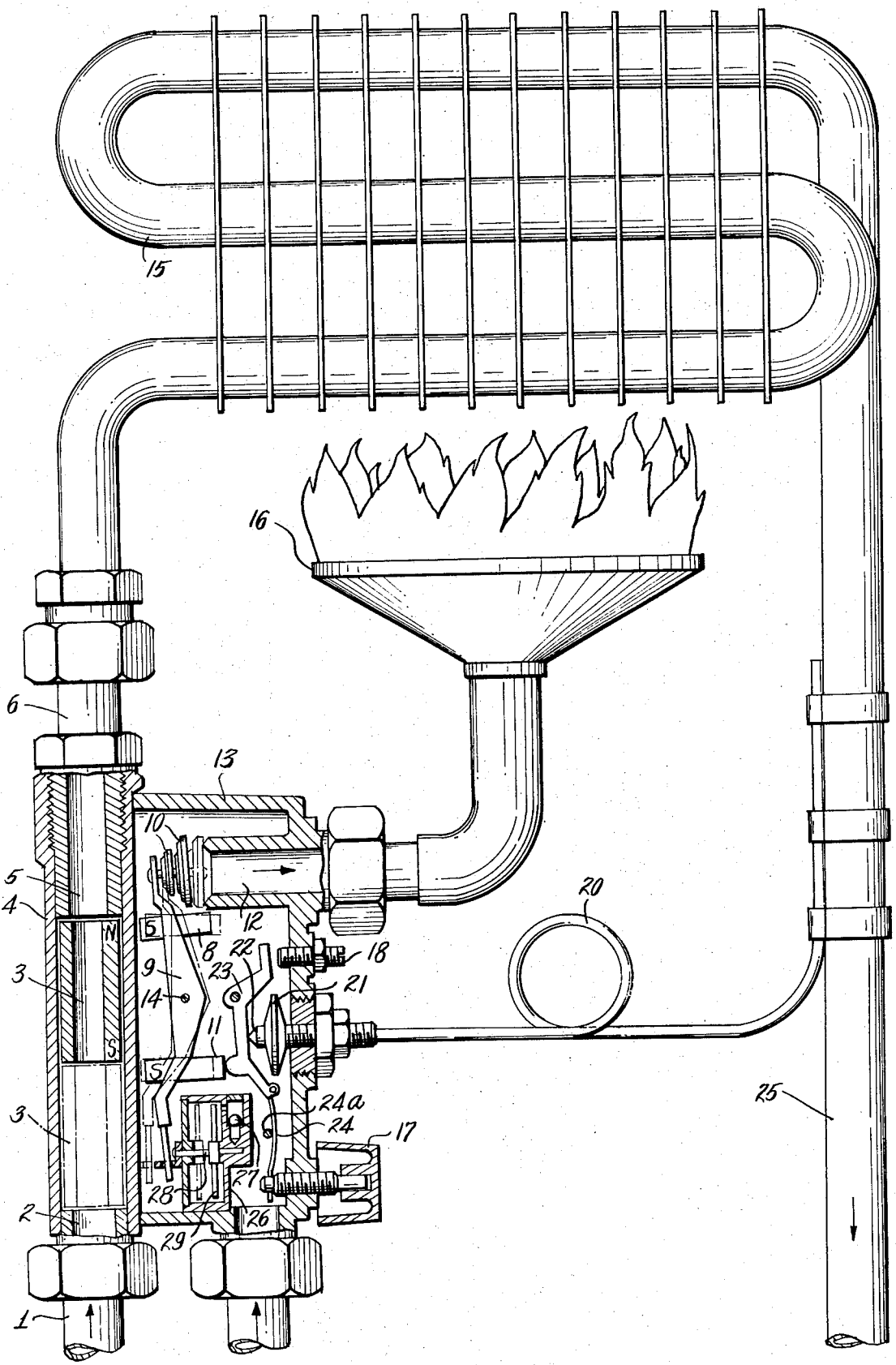

CONTROL MEANS FOR LIQUID HEATER

SUMMARY OF THE INVENTION

This invention relates to a magnetically actuated device for controlling the supply of energy to a heater in dependence on the flow and temperature of a liquid being heated by that heater.

It is particularly useful in controlling the flow of the heating gas supplied to heat the water in an instantaneous water heater. In such heaters the flow of heating gas must be automatically responsive to the temperature of heated water, and must be cut off promptly once water ceases to flow. While the gas cut-off must be responsive to water flow, it is highly desirable that the water system be completely sealed off from the gas system. It is also desirable that the device act more rapidly to cut off the gas than to re-open the supply, and include heat responsive means for regulating the gas flow in dependence upon the temperature attained by the water being heated. In most installations the valve for cutting off the gas supply in response to water failure and for regulating the flow of gas in response to water temperature are entirely separate, but it is an advantage of my device that a single valve member is utilized for both purposes.

A representative embodiment of my invention accordingly comprises a gas cut-off valve which is magnetically actuated by the movement of a magnet in the water inlet, so that the water system may be completely sealed, and in which the degree of opening of the same valve is determined by a thermostat, movement of the valve toward its open position being inhibited by a dash-pot.

A preferred embodiment of the invention will now be described with reference to the accompanying drawing which is a side elevational view of a heater utilizing a control means according to the invention, with the casing broken away to show the internal parts of the control means.

As shown in the drawing, the heater comprises a water inlet pipe 1, the upper end 2 of which is seated in sleeve 4. A duct 5 leading through a pipe 6 to a heat exchanger 15 is seated in the other end of the sleeve. A cylindrical permanent magnet 3 is mounted to slide in the sleeve 4 between the limit stops formed by the upper end 2 of the inlet pipe 1 and the lower end of the duct 5.

A box 13 is attached to one side of the sleeve 4. Inside this box a bar 9 is mounted to pivot freely about a pin 14. This bar carries permanent magnets 8 and 11 near its two ends. The upper end of the bar carries two plastic valve members, which may be made of neoprene or the like, and serve to close a gas outlet 12, when the upper end of the bar is swung to the right of the figure.

The lower end of the bar is connected to a pin 28 carrying a disc 29 which moves in the shock-absorbing chamber 26. A check valve 27 acts to inhibit the flow of gas out of the chamber 26, so that swinging of the bar 9 in a direction which opens the outlet duct 12 encounters considerable resistance. On the other hand, the valve 27 is arranged to provide less resistance to the entry of gas into the chamber 26, so that the duct 12 may be closed more quickly than it can be opened.

Whenever a predetermined minimum amount of water flows upwardly through the sleeve 4, the cylindrical magnet 3 is driven from its lowest to its uppermost position. As this cylindrical magnet rises, its north and south poles approach the south poles of the magnets 8 and 11 on the swinging bar 9. The result is to attract the upper magnet 8 and repel the lower magnet 11, thus swinging the bar into the position shown in solid lines on the drawing and permitting the flow of gas into the duct 12 leading to the burner 16.

If, on the other hand, the flow of water through the sleeve 4 falls below a predetermined minimum, or ceases entirely, the cylindrical magnet 3 will descend, to bring its north pole opposite the lower magnet 11 on the bar 9. The resulting attraction draws the lower end of the bar 9 to the left, thus swinging its upper end to the right, to close the outlet 12. It will be noted that the path of travel of the cylindrical magnet 3 is so limited by the ends of the ducts 2 and 5 as to bring the north pole of magnet 3 opposite magnet 11 when 3 is in its lower position and opposite magnet 8 when 3 is in its upper position.

If the sleeve 4 should be horizontally positioned, a spring may be positioned between the north pole of the cylindrical magnet 3 and the end of the duct 5, as a substitute for the force of gravity.

The valve illustrated is equipped with manually adjustable thermostatic control means which is used to control the amount of gas that reaches the burner 16 so that the heater may deliver water at a constant temperature. This thermostatic control means comprises a control knob 17 carrying an index line which cooperates with a scale on the outside of the box 13. The expansible chamber 21 contains a fluid, the volume of which is quite sensitive to variations in temperature, and is connected to a capillary tube 20 leading to the heat exchanger outlet 25. An increase in the temperature in the outlet duct 25 causes expansion of the liquid in the capillary tube 20 and in the expansible chamber 21, urging the protuberance 22 against the pivotally mounted lever 23, the movement of which is limited by the adjustable stop 18, and the setting of which is controlled by the knob 17 through the flexible lever 24, which swings about the pin 24a. It will be seen that, when the outlet 12 is open, either expansion of the expansible chamber 21, or rotation of the knob 17 to withdraw the screw on which it is mounted, will urge the lower end of the arm 23 to the left against magnet 11, thus tending to close the outlet 12. Movement in the opposite direction will permit the magnets to more fully open the outlet 12. When, on the other hand, the outlet 12 is closed, the arm 23 is too far from the magnet 11 for its movements to affect the position of the valve member 10.

The operation of the device is now believed to be clear. So long as there is no water, or an insufficient supply of water, passing through the sleeve 4, the cylindrical magnet will remain in its lower position and the sealing member 10 will be held in its phantom-line position, preventing gas from entering the outlet 12 leading to the burner 16. When the rate of flow through the sleeve 4 becomes sufficient to lift the cylindrical magnet 3, the lever 9 will swing to its solid-line position, drawing the sealing member 10 away from the outlet 12 to permit the flow of gas therethrough. This movement is resisted by the dash-pot 26, 29, so that the flow of gas begins slowly. The extent of opening is determined by the point at which the magnet 11 on the lever 9 strikes the arm 23. If the water becomes too hot, the thermostat moves the lever 23 to the left, thus urging the valve member 10 closer to the outlet 12, and reducing the flow of gas. If the water becomes too cool, the converse occurs. The temperature which results in an increase in the gas flow is determined by the setting of the knob 17. If the water supply fails, the cylindrical magnet 3 drops, and the sealing member 10 is swung quickly to close the outlet 12. The dash-pot 26 provides little resistance to such action, since the check valve 27 permits free flow into the dash-pot chamber.

It will, of course, be appreciated that the foregoing embodiment has been given merely by way of example, and may be modified as to detail without thereby departing from the basic principles of the invention. For example, the valve member 10 may be replaced by the movable contact of an electric switch and the gas outlet 12 by the stationary contact of such a switch, which is connected to control the flow of electricity to an electric heater instead of controlling the flow of gas to a burner. In this case the movable contact, when in closed position, may be slidable over a resistor, as in a rheostat, in response to the thermostat.

What is claimed is:

1. Means for controlling the supply of energy to a liquid heater, said control means comprising a passage for conducting liquid to said heater, a permanent magnet mounted in said passage for axial movement from a first position to a second position in said passage in response to the flow of liquid therethrough, energy supply interrupting means, for interrupting the supply of energy to said heater a bar carrying said interrupting means and mounted adjacent said passage to swing about an axis perpendicular thereto, said bar carrying at least one permanent magnet, said magnets being positioned to swing said bar into a first position in which said interrupting means interrupts said supply of energy when the magnet in said passage is in said first position and a second position in which said supply of energy is permitted when the magnet in said passage is in its second position, dash-pot means inhibiting the movement of said bar toward said second position more effectively than it inhibits its movement toward said first position, and thermostat means mounted to adjust the location of said bar and interrupting means when said bar is in said second position in dependence on the temperature of liquid heated by said heater.

2. Control means as claimed in claim 1 in which said bar has two arms extending in opposite directions from said axis, each of which carries a permanent magnet, one of which magnets is attracted and one of which is repelled by the magnet in said passage when said passage-mounted magnet is in its second position.

3. Control means as claimed in claim 2 in which the distance between the first and second positions of the magnet in said passage is substantially equal to the distance between the two magnets carried by said bar.

4. Control means as claimed in claim 1 in which said bar is mounted in a box having a gas inlet and a gas outlet, and said interrupting means is mounted to open and close said gas outlet.

5. Control means as claimed in claim 1 in which said thermostat means comprises a lever mounted to swing about an axis parallel to that of said bar and defining a stop which limits the pivotal movement of said bar in one direction, and an expansible chamber containing a fluid which the volume of which varies as a function of temperature, said chamber being positioned to bias said lever, and the fluid in said chamber being in heat-exchange relationship with the liquid heated by said heater.

6. Control means as claimed in claim 5 comprising manually adjustable means for biassing said lever toward a selected position.

* * * * *

UNITED STATES PATENT OFFICE
CERTIFICATE OF CORRECTION

Patent No. 3,806,026     Dated April 23, 1974

Inventor(s) URSUS TROTTER & ALBIN TROTTER

It is certified that error appears in the above-identified patent and that said Letters Patent are hereby corrected as shown below:

[22] Filed: March 26, 1973

Signed and sealed this 8th day of October 1974.

(SEAL)
Attest:

McCOY M. GIBSON JR.
Attesting Officer

C. MARSHALL DANN
Commissioner of Patents